United States Patent
Saenz et al.

(10) Patent No.: US 6,336,778 B1
(45) Date of Patent: Jan. 8, 2002

(54) ORTHOGONAL AXES MODULE WITH PARALLEL KINEMATIC MOVEMENT

(75) Inventors: Agustin J. Saenz; Valentin Collado, both of Elgoibar (ES)

(73) Assignee: Fundacion Fatronik (ES)

( * ) Notice: Subject to any disclaimer, the term of this patent is extended or adjusted under 35 U.S.C. 154(b) by 0 days.

(21) Appl. No.: 09/501,108

(22) Filed: Feb. 9, 2000

(30) Foreign Application Priority Data

Feb. 11, 1999 (ES) ............................................... 9900283

(51) Int. Cl.⁷ ............................... B23C 1/00; B23Q 1/48
(52) U.S. Cl. .................... 409/201; 74/490.08; 409/211; 409/216; 409/235
(58) Field of Search ................................ 409/211, 216, 409/235, 201, 183, 204, 206, 107, 109; 483/901; 74/490.08, 490.12, 490.09, 490.03, 89.15, 479.01; 901/29, 25

(56) References Cited

U.S. PATENT DOCUMENTS

| | | | | |
|---|---|---|---|---|
| 4,962,676 A | * | 10/1990 | Vainstock | 74/490.03 |
| 5,167,160 A | * | 12/1992 | Brucher | 74/479.01 |
| 5,267,818 A | * | 12/1993 | Marantette | 409/235 |
| 5,378,282 A | * | 1/1995 | Pollard | 74/490.06 |
| 5,569,004 A | * | 10/1996 | Marantette | 409/235 |
| 5,592,793 A | * | 1/1997 | Damraytowski et al. | 409/240 X |
| 5,715,729 A | * | 2/1998 | Toyama et al. | 409/211 X |
| 5,807,044 A | * | 9/1998 | Watari et al. | 409/183 |
| 5,903,125 A | * | 5/1999 | Prentice et al. | 74/471 X |
| 6,099,217 A | * | 8/2000 | Wiegand | 409/201 |
| 6,161,992 A | * | 12/2000 | Holy et al. | 409/201 X |

FOREIGN PATENT DOCUMENTS

| | | | |
|---|---|---|---|
| EP | 674969 A1 * | 2/1995 | 409/211 |
| EP | 812652 A1 * | 6/1997 | 409/216 |
| FR | 2612826 * | 9/1988 | 409/211 |

* cited by examiner

Primary Examiner—William Briggs
(74) Attorney, Agent, or Firm—Bierman, Muserlian and Lucas

(57) ABSTRACT

Module with parallel kinematic movement and orthogonal axes, characterised because it has a fixed structure; and a passive structure that has at least one kinematic shears joined at one end to the fixed structure and at the other end to a flat mobile structure, one of these unions being articulated; and a spatial mobile structure carrying the work head and which can be moved linearly respect to the flat mobile structure; and arms joined at one end to the fixed structure and at the other end to the spatial mobile structure, one of the unions having two degrees of freedom and the other union three degrees of freedom; and means to activate the movement of the arms.

3 Claims, 2 Drawing Sheets

ORTHOGONAL AXES MODULE WITH PARALLEL KINEMATIC MOVEMENT

The machine in question is a module with synchronised parallel movements so that combined together they generate three co-ordinate axes in the tool or clamp. Its application is preferably focused on transfer machines, machining centres, agile modules and/or component manipulation applications.

This invention is designed as the next generation of machines which, applied in different layouts or utilities, can facilitate the adjustment of certain machinery manufacturing firms to the demand of such demanding sectors as the motor vehicle sector, thus maintaining or improving their competitive capacity on this market which, over the last few years has been directly or indirectly consuming more than 50% of the machine-tool production.

The current demands of this type of market are forcing the machinery manufacturers to adopt more and more creative constructive solutions that differ from the traditional machines, as these are within their limit optimisation for the majority of the basic design parameters.

In this regard the parallel kinematic solutions, that is, machines with drives that work simultaneously instead of decoupled, provide a qualitative solution for many of the existing problems.

One of the first applications of machines with non-Cartesian architecture is based on the parallel kinematics of the Stewart platform for the manufacture of air simulators (end of the sixties).

In the case of this machine: the head is mounted on a platform supported by six telescopic shafts. The shafts are directly connected to the fixed table. The length of the telescopic shafts determines the position of the head, which moves with 6 degrees of freedom (3 traverses and 3 rotations) where the maximum permissible angle is restricted to 30°.

As a result of this, the Cartesian axes do not appear as such and they only exist in a virtual way in the control system.

The main difference with the Cartesian mechanisms lies in that there is not just one kinematic chain that transmits all the forces, but that in the case of six shafts, these form six "parallel" kinematic chains where the forces are distributed.

Here, each shaft defines a degree of freedom and transmits only purely tractive or compressive forces in the direction of the position of the shaft.

In the parallel mechanisms, no shaft "draws" the other. And therefore, the mass to be moved is considerably less than that of the traditional machines. The forces are distributed over all the shafts. Therefore, the parallel mechanisms with very small masses to be moved can be manufactured in a very rigid way. The combination of small masses to be moved and high rigidity means that the parallel mechanisms are of special interest in high speed machining.

However, the telescopic shafts are difficult to design with sufficient rigidity. In addition, the working area of the hexapod is always symmetrical in rotation and cannot be designed arbitrarily. In addition, the hexapods are relatively large in existing prototypes.

Currently, an attempt is being made to develop solutions whose kinematics has the advantages of the parallel structures but which avoid some of the disadvantages. Shafts mounted on slides, which move on parallel guides, linear motors that act as drives.

The applicant has developed a module with parallel kinematic movement, which presents the following characteristics and advantages respect to known devices.

This invention is comprised of several structural elements:

The passive structure, without drives, which supports the movements on a plane, is based on one or several kinematic shears articulated on at least one edge. The aim of this mobile structure is to absorb stress in the three Cartesian axes and in the three moments.

A fixed structure, which supports the whole machine, is joined to this passive structure on one side and on the other there is a mobile structure that carries the head with the relative guides.

On the one hand, there are some "arms" which are joined on the one hand to the fixed structure and on the other to the mobile structure that carries the head or the clamp by means of cardan joints or by means of spherical ball joints. These active arms are the ones where the drives are implemented.

The distribution in the space of the anchorage points to the fixed structure, to the mobile structure and to the arms must be calculated depending on the rigidity, speed and acceleration that the tool is to be provided with.

This invention presents a series of very important advantages both from the structural viewpoint and from the kinematic and dynamic viewpoint.

- The configuration described above presents minimal rigidities at any point of its work volume that are three times greater than those of any traditional machine. This is due to the combination of the good position of mobile structural elements in the space joined to the passive elements.
- The work volume of the machine in $mm^3$ is more than twice the work volume of a machine with the same working cube.
- The machine volume ratio occupied respect to the working cube that the tool or clamp can reach is similar to that of the most demanding machines with serial drives and much greater than that of the existing machines with parallel drives.
- From the viewpoint of its use in sectors where the machine width is essential as production lines are configured and therefore the minimum transfer distance between modules is critical, it can be said that this invention optimises the width measurement respect to the course requested in that dimension as for machine measurements of 1 we obtain possible courses of 0.8.
- In the most simple configuration of the invention the number of drives used is the same as the number of the shafts of the movement controlled, in this aspect it is clearly better than the traditional parallel kinematic solutions with six arms and five shafts.
- The combination of "bar" type active structural elements with the articulated passive structures permits considerably greater bending moments to be supported than the rest of solutions which only have three "bar" type structures.
- The weight that the drives have to move is considerably less than that of a traditional machine with similar course movements.
- The number of components that comprise this machine is considerably less than the number of components of a traditional machine so both its final cost and the installation are substantially reduced.
- As there are no structural elements such as carriages and intermediate parts the necessary machining and therefore the cost is considerably reduced.
- The distribution of the possible work volume for the machine makes it possible to circumscribe an orthogonal working cube but it leaves extra-courses free that can be used to carry out collateral activities such as tool changes, tool checks, etc., without having to invade the part area.

The most complex variant of the machine, with a supplementary drive, enables the relative rotation of the structure, which encircles the head support around axis Z to be controlled. Thus positions with greater rigidity can be achieved.

The layout of the machine in the space related to the fixed structure can vary without affecting the performance of the invention at all. This, however, can allow the client to choose greater courses in some of the axes at random without any additional cost for the manufacturer.

In order to have a better understanding of the object of this invention, a preferential way of practical execution is shown in the drawings, which is susceptible to incidental changes that do not detract from its basics.

Figure 1:
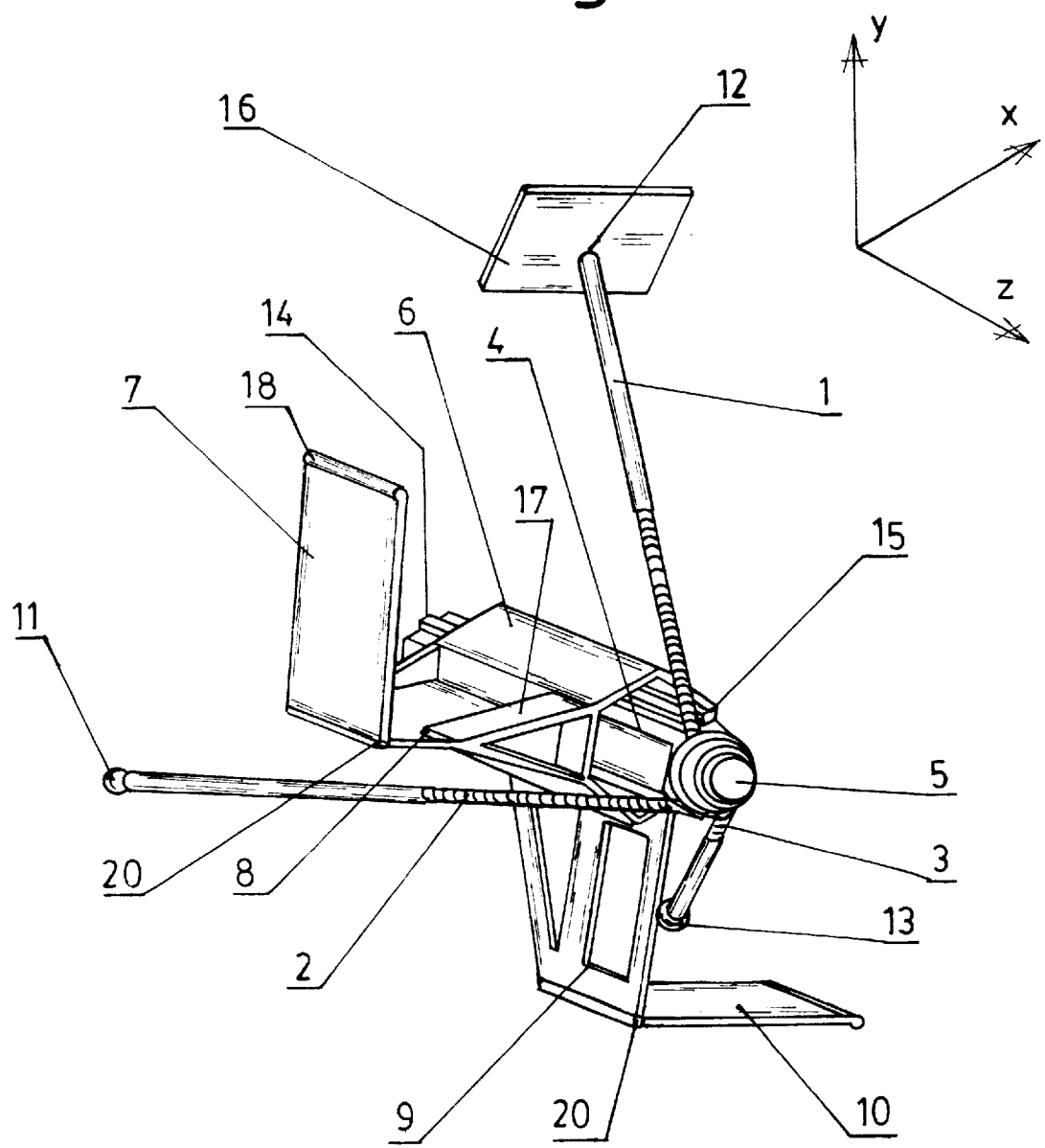
FIG. 1 is a schematic and perspective illustration of a practical execution with three active arms of the module targeted by the invention.

Below an example of a practical execution of this invention is described, but which is not limiting.

There are some active arms (three in FIG. 1) (1, 2, 3) which in this execution are spindles, which are provided with movement by a traditional system such as a motor, gearmotor, pulleys or any other transmission means.

The arms (1), (2), (3) are joined at one end to the fixed structure or bedframe (16) by means of joints (11), (12), (13) with two degrees of freedom like universal or cardan joints, and at the other end they are joined to a mobile spatial structure (4) by means of joints (15) with three degrees of freedom, such as spherical or ball joints.

The invention foresees that the joints with three degrees of freedom are those of the end that is joined to the bedframe (16) and the joints with two degrees of freedom are the ones that are joined to the spatial mobile structure (4).

The spatial mobile structure (4) carries the head or the clamp (5), which moves with orthogonal movements according to the three co-ordinate axes in the space drawn by the movement of the arms (1), (2), (3).

The union of the spatial mobile structure (4) to the mobile flat structure (6) is carried out by linear guides (14) which permit its relative movement according to Z. The flat mobile structure (6) is joined in turn to the fixed structure or bedframe by means of a passive structure, without drives, comprised of one or several kinematic shears (7–8, 9–10), with their relative articulation (20).

These shears are joined (18) at one end to the bedframe (16) and at the other (17) to the flat mobile structure (6).

These unions (17), (18) must be articulated, except one of the shears, which must have one fixed joint, either (17) or (18). In FIG. 1, one of the ends (17) of the shears (7, 8) is flushmounted into the flat mobile structure (6).

Figure 2:
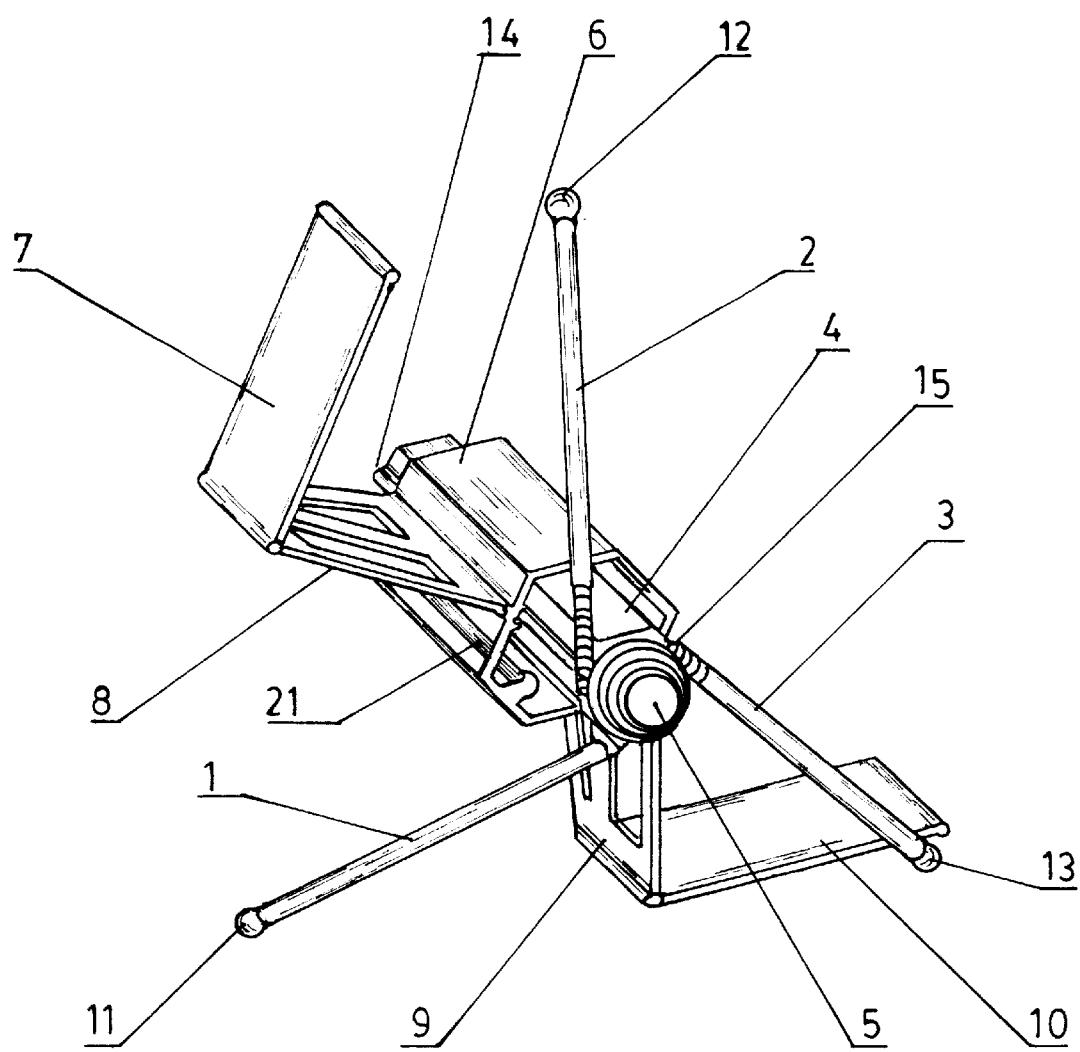
FIG. 2 is a schematic and perspective illustration of a practical execution with three active arms of the module targeted by the invention, plus a supplementary drive.

FIG. 2 presents a variant with a supplementary drive (21) which gives rise to the movement according to Z-axis of the spatial mobile structure (4) respect to the mobile flat structure (6). In this case all the aforementioned is valid for a module with three arms, except with respect to the shears, which must have articulated unions at both ends, as a result controlling the rotation around Z-axis of the head (5).

With respect to the drives, this invention does not present any limitation and it has been designed with the possibility of including both direct drives from the motor and with possible reductions and/or increases in revolutions. In both cases the active arms are activated.

One of the main differentiating improvements of this new solution, which has been mentioned above, is the feature that it offers respect to possible accelerations and speeds to be achieved in the tool. At all the points of the work space and according to any direction, speeds and accelerations can be achieved that are at least the same, or in the majority of the cases, greater than those given by each of the activated arms.

The performance of the invention from a dynamic viewpoint of natural frequencies and modes also turns out to be advantageous as the rigidity increases reducing the mass with respect to a traditional machine.

What is claimed is:

1. A machine for carrying a working head and having movement in three orthogonal axes with parallel kinematic movement comprising:

a) a fixed structure;

b) a flat mobile structure;

c) a passive structure which has at least one jointed frame, said jointed frame affixed at one end to said fixed structure by a first union and at the other end to said flat mobile structure by a second union, one of said first or second unions being articulating;

d) a spatial mobile structure movably affixed to said flat mobile structure so as to move linearly with respect to said flat mobile structure, said spatial mobile structure for carrying the working head;

e) three movable arms, each of said arms affixed at one end to said fixed structure by a third union and at the other end to said spatial mobile structure by a fourth union, wherein one of said third or fourth unions has two degrees of freedom and the other of said third or fourth unions has three degrees of freedom; and f) means to activate the movement of said arms.

2. The machine of claim 1 wherein said passive structure has several jointed frames connecting said flat mobile structure to said fixed structure, wherein one of said jointed frames has a first union which articulates with respect to said fixed structure and has a second union which is fixed to said flat mobile structure, the other of said jointed frames has both the first and second unions articulate.

3. The machine of claim 1 further comprising a driver affixed to said flat mobile structure and said spatial mobile structure so as to linearly move said spatial mobile structure with respect to said flat mobile structure, and said first and second unions articulating.

* * * * *